(12) United States Patent
Pietraski (10) Patent No.: US 7,912,490 B2
(45) Date of Patent: Mar. 22, 2011

(54) METHOD FOR CHANNEL QUALITY PREDICTION FOR WIRELESS COMMUNICATION SYSTEMS

(75) Inventor: Philip J. Pietraski, Huntington Station, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 10/698,721

(22) Filed: Oct. 31, 2003

(65) Prior Publication Data

US 2004/0142698 A1 Jul. 22, 2004

Related U.S. Application Data

(60) Provisional application No. 60/423,620, filed on Nov. 1, 2002.

(51) Int. Cl.
H04B 7/00 (2006.01)
(52) U.S. Cl. .................. 455/522; 455/69; 455/452.2
(58) Field of Classification Search .............. 455/67.11, 455/67.13, 67.14, 115.1, 115.2, 115.3, 134, 455/135, 161.3, 226.1, 226.2, 277.2, 423, 455/452.2, 13.4, 127.1, 522, 69; 702/182, 702/183; 370/252
See application file for complete search history.

(56) References Cited

U.S. PATENT DOCUMENTS

| | | | | |
|---|---|---|---|---|
| 4,335,361 A * | 6/1982 | Acker | ............................ | 330/285 |
| 5,305,468 A * | 4/1994 | Bruckert et al. | ................. | 455/69 |
| 5,541,955 A | 7/1996 | Meyer et al. | | |
| 5,722,070 A | 2/1998 | Alford | | |
| 5,953,669 A * | 9/1999 | Stratis et al. | .................. | 455/449 |
| 6,088,324 A * | 7/2000 | Sato | ............................... | 370/203 |
| 6,108,374 A * | 8/2000 | Balachandran et al. | ....... | 375/227 |
| 6,404,827 B1 * | 6/2002 | Uesugi | ........................... | 375/340 |
| 6,665,271 B1 * | 12/2003 | Thomas et al. | ................ | 370/252 |
| 6,731,990 B1 * | 5/2004 | Carter et al. | ..................... | 700/52 |
| 7,336,629 B1 * | 2/2008 | Raitola | .......................... | 370/311 |
| 2001/0034239 A1 * | 10/2001 | Yamato et al. | ................ | 455/456 |
| 2002/0034944 A1 | 3/2002 | Tanno et al. | | |

(Continued)

FOREIGN PATENT DOCUMENTS

EP 0 899 906 3/1999

(Continued)

OTHER PUBLICATIONS

Duel-Hallen et al. "Long-Range Prediction of Fading Signals." IEEE Signal Processing Magazine, vol. 17, No. 3, May 2000, pp. 62-75.

(Continued)

*Primary Examiner* — Kent Chang
*Assistant Examiner* — Dung Lam
(74) *Attorney, Agent, or Firm* — Volpe and Koenig, P.C.

(57) ABSTRACT

A method of improved performance through channel quality prediction for communications systems employing link adaption techniques includes a receiver which makes selective measurements on downlink transmissions, and then stores one or more of the measurements or a channel quality indicator derived therefrom. The receiver then retrieves one or more of the past measurements (or the past channel quality estimates themselves), and combines it with current measurements (or the current channel quality estimate), to predict what the channel quality will be at some future time and derive a predictive channel quality indicator (CQI). This predictive CQI, derived from both current channel measurements and at least one past channel measurement, is then sent to the transmitter for use in updating transmission parameters.

15 Claims, 7 Drawing Sheets

U.S. PATENT DOCUMENTS

| | | | |
|---|---|---|---|
| 2002/0058505 A1 | 5/2002 | Kim et al. | |
| 2002/0097686 A1* | 7/2002 | Qiu | 370/252 |
| 2002/0123351 A1 | 9/2002 | Miyoshi et al. | |
| 2003/0017835 A1* | 1/2003 | Bergel | 455/502 |
| 2003/0072355 A1 | 4/2003 | Lee et al. | |
| 2003/0129992 A1* | 7/2003 | Koorapaty et al. | 455/456 |
| 2003/0142647 A1 | 7/2003 | Agrawal et al. | |
| 2004/0008644 A1 | 1/2004 | Holtzman et al. | |
| 2004/0203475 A1* | 10/2004 | Gaal | 455/69 |

FOREIGN PATENT DOCUMENTS

| | | |
|---|---|---|
| EP | 0899906 | 3/1999 |
| EP | 899906 A2 * | 3/1999 |
| EP | 1 178 623 | 2/2002 |
| EP | 1178623 | 2/2002 |
| JP | 2000-174731 | 6/2000 |
| JP | 2000-315975 | 11/2000 |
| JP | 2002-152228 | 5/2002 |
| WO | 98/38763 | 9/1998 |
| WO | 01/31938 | 5/2001 |

OTHER PUBLICATIONS

Duel-Hallen et al. "Long-Range Prediction of Fading Signals." IEEE Signal Processing Magazine, vol. 17, No. 3, May 2000, pp. 62-75.
Duel-Hallen et al. "Long-Range Prediction of Fading Signals." IEEE Signal Processing Magazine, vol. 17, No. 3, May 2000, pp. 62-75.

* cited by examiner

METHOD FOR CHANNEL QUALITY PREDICTION FOR WIRELESS COMMUNICATION SYSTEMS

CROSS REFERENCE TO RELATED APPLICATION

This application claims priority from U.S. Patent Application Ser. No. 60/423,620, filed Nov. 1, 2003, which is incorporated by reference as if fully set forth.

FIELD OF INVENTION

The present invention generally relates to wireless communication systems. More particularly, the present invention is a method employed by a wireless communication system for improved channel quality indication in dynamic link adaptation.

BACKGROUND

Various algorithms are currently used by present wireless communication systems for estimating channel quality at a wireless receiver. These algorithms are employed, for example, in systems using the Third Generation Partnership Project (3GPP) High Chip Rate Time Division Duplex (TDD) mode, the 3GPP Low Chip Rate TDD mode, the 3GPP Frequency Division Duplex (FDD) mode, the time division-synchronous code division multiple access (TD-SCDMA) standard, and High Speed Downlink Packet Access (HSDPA) extensions of the aforementioned systems. The quality estimates may be used for transmit power control, in- and out-of-synchronization decisions, radio link failure decisions, and channel quality indicators (CQIs) to support dynamic link adaptation, (e.g., adaptive modulation and coding (AMC)) techniques.

In the TDD mode for instance, the quality indicator, referred to as CQI, sent by the User Equipment (UE) on the high speed-shared information channel (HS-SICH) is a recommended Transport Format Resource Combination (TFRC). In general, the TFRC refers to the possible transport block sizes, modulation schemes, and any other link adaptation parameters available. The recommended TFRC is usually based on the signal most recently received by the UE.

Regardless of whether or not the communication system is a 3GPP system, the CQI could represent a recommended Transport Block Size, modulation format, number of codes, power offsets, or any one of a number of different types of link adaptation parameters. These CQIs are derived by a receiver and signaled to a transmitter to set the transmission parameters for a subsequent transmission.

The CQI typically provides either specific link adaptation information, such as a recommended coding and modulation scheme for the AMC function, or provides one or more general quality indicators which are subsequently used to base the selection of appropriate transmission parameters.

If the CQI is not accurate, the selected modulation and coding scheme (or other transmission parameters) will be suboptimal. Overestimating channel quality can cause the UE and Node B to continue attempting to use a modulation and coding scheme when reception quality is too poor to justify their continued use. Underestimation of channel quality may lead to excessive transmission power and inefficient use of radio recourses or, in the case of in- and out-of-sync processing, ultimately a premature declaration of radio link failure and release of radio resources. Thus, a call may be dropped without cause. Excessive transmission power will, in turn, lead to a system-level throughput loss since interference in other cells may increase needlessly. Accordingly, inaccurate channel quality estimation reduces throughput, wastes transmit power, and increases interference to other cells.

Figure 1:
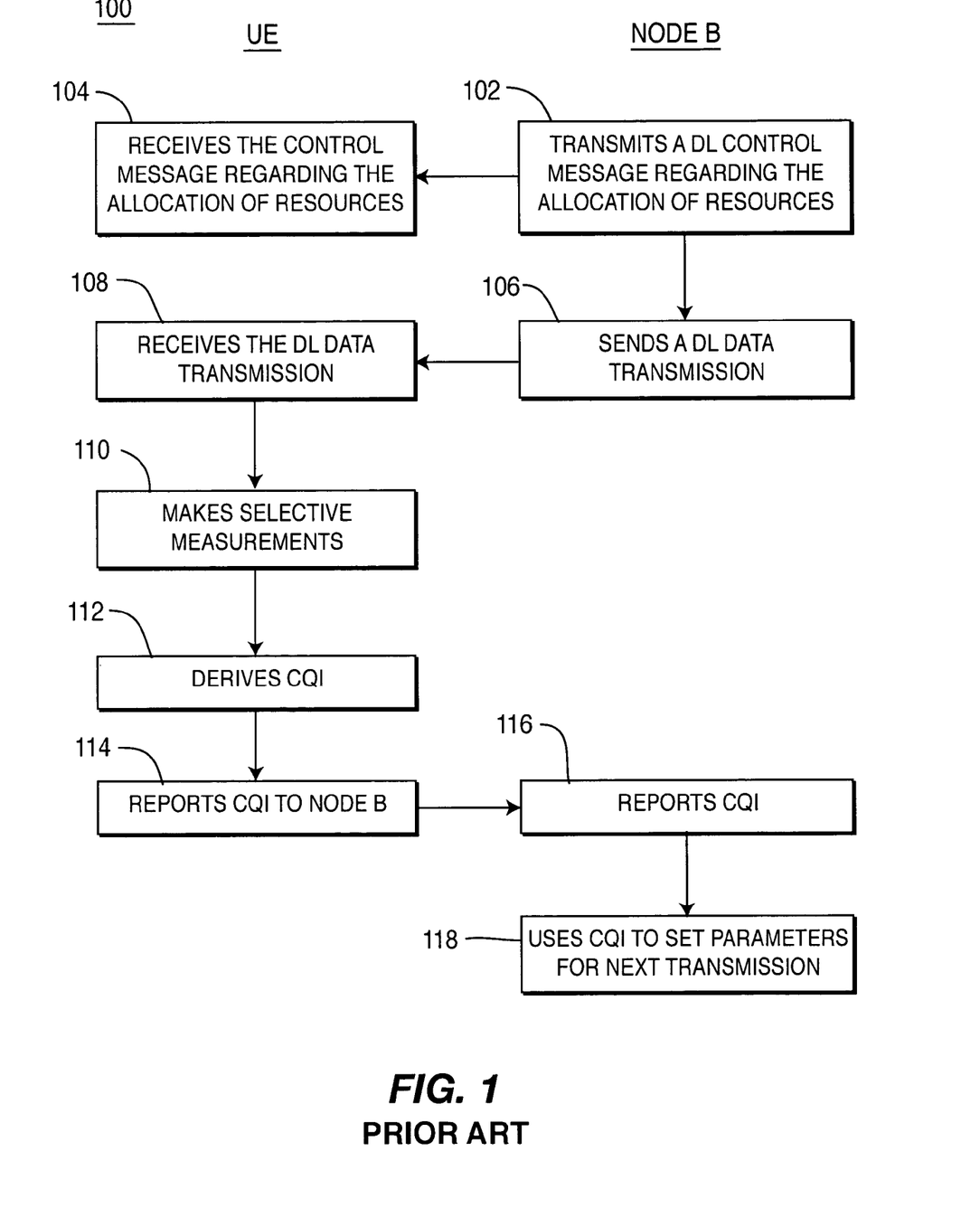
FIG. 1 is a flow diagram of a method for CQI generation and reporting in accordance with the prior art.

A shortcoming of prior art channel estimation techniques is that since the techniques estimate channel quality at a receiver, they do not provide sufficiently accurate estimates of channel quality at the transmitter at the time of the subsequent transmission. Referring to FIG. 1, a prior art CQI generation and reporting procedure 100 between a UE and a Node B is shown. The Node B transmits a message on a downlink (DL) control channel (step 102), informing the UE which resources have been allocated to the UE for the next associated DL data transmission. The UE receives the control message regarding the allocation of resources and awaits the receipt of the DL data transmission (step 104).

The Node B sends the associated DL data transmission (step 106). The UE reads the DL data transmission (step 108) and makes selective quality measurements (step 110). Using the measurements from step 110, the UE derives a CQI (step 112) that it estimates would provide the highest throughput, while still meeting other possibly specified requirements, such as a block error rate (BLER).

The UE then reports the most recently derived CQI to the Node B in the next available UL control channel (step 114). The Node B receives the CQI (step 116) and then uses the CQI to set the transmission parameters for the next data transmission (step 118).

There are drawbacks with the current method of providing CQI feedback. For example, the current 3GPP specification does not set a specific time limit on how long the UE may take to derive the CQI. This could take an inordinately long time. It is, however, required (and desirable) that once the CQI is derived from the given data transmission, it is reported in the next available UL control channel. This minimizes the delay in getting the CQI information to the Node B. However, even if the delay in getting the CQI information from the UE to the Node B is minimized, the delay is not eliminated.

Figure 2:
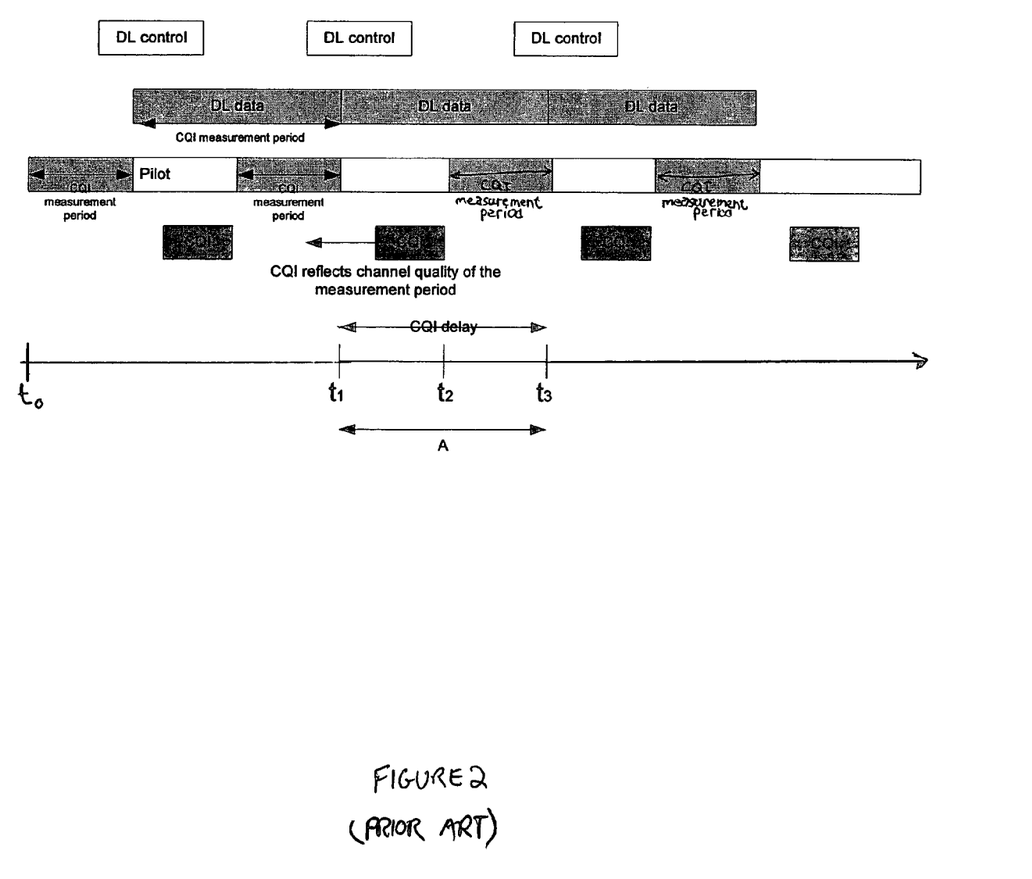
FIG. 2 is a timing diagram showing the delay associated with the prior art CQI reporting method of FIG. 1.

As shown in the example timing diagram of FIG. 2, there is a CQI measurement period on one or more DL transmissions, during which the UE makes selective measurements on the DL transmission. As shown, the measurements may be performed on a DL data channel, a DL pilot channel, or a combination of both the DL data and pilot channels. After the measurements are performed, the CQI is calculated; this is shown at time $t_1$. Although the delay is minimized by reporting the CQI to the Node B at the next available UL transmission (shown at time $t_2$), there is additional delay until the subsequent use by the Node B of the CQI (shown at time $t_3$) to set the parameters for the next downlink data transmission.

The delay (graphically designated as A) between the completion of the measurements upon which the CQI is based (at time $t_1$) and the subsequent use by the Node B to set the associated transmission parameters at time $t_3$ results in a CQI that is not accurate by the time it is used by the Node B. The greater this delay, the less accurate the CQI becomes. As the CQI becomes less accurate, the DL channel quality will ultimately suffer since the transmission parameters will be based on a CQI that does not accurately reflect the true channel conditions. In essence, the prior art methods of CQI determination reflect the past conditions of the channel.

It would be desirable to provide a method of channel quality determination without the severe disadvantages of known prior art systems.

SUMMARY

The present invention provides a method of improved performance through channel quality prediction for communications systems employing link adaption techniques. A receiver makes selective measurements on DL transmissions and then stores one or more of the measurements or a channel quality indicator derived therefrom. The receiver then retrieves one or more of the past measurements (or the past channel quality estimates themselves), and combines it with current measurements (or the current channel quality estimate), to predict what the channel quality will be at some future time to derive a predictive channel quality indicator (CQI). This predictive CQI, derived from both current channel measurements and at least one past channel measurement, is then sent to the transmitter for use in updating transmission parameters.

BRIEF DESCRIPTION OF THE DRAWING(S)

A more detailed understanding of the invention may be had from the following description of preferred embodiments, given by way of example and to be understood in conjunction with the accompanying drawing wherein.

This application uses the following acronyms:

| 3GPP | Third Generation Partnership Project |
|---|---|
| AMC | Adaptive Modulation and Coding |
| CDMA | Code Division Multiple Access |
| CQI | Channel Quality Indicator |
| DL | Downlink |
| FDD | Frequency Division Duplex |
| HSDPA | High Speed Downlink Packet Access |
| HS-DPCCH | Shared Information Channel for HS-DSC (FDD) |
| HS-SICH | High Speed Shared Information Channel for HS-DSCH (TDD) |
| SIR | Signal-to-Interference Ratio |
| TDD | Time Division Duplex |
| TD-SCDMA | Time Division-Synchronous Code Division Multiple Access |
| TFRC | Transport Format Resource Combination |
| UE | User Equipment |
| UL | Uplink |

DETAILED DESCRIPTION OF THE PREFERRED EMBODIMENT(S)

The present invention provides an improved method of channel quality prediction without the disadvantages of the prior art.

Hereafter, a wireless transmit/receive unit (WTRU) includes but is not limited to a UE, mobile station, fixed or mobile subscriber unit, pager, or any other type of device capable of operating in a wireless environment. Each of these terms may be used interchangeably herein. When referred to hereafter, a Node B includes but is not limited to a base station, site controller, access point or any other type of interfacing device in a wireless environment. Each of these terms may be used interchangeably herein.

It is to be noted that the present invention is applicable to TDD, FDD, TD-SCDMA, CDMA 2000, and other modes and types of transmissions without exception. More generally, the present invention is applicable to any communication system employing a scheme which monitors channel quality and adapts the transmission parameters of subsequent transmissions based upon the channel quality, such as AMC or other forms of radio link adaptation.

In accordance with the present invention, the CQI is a predictive indicator of the quality of future channel conditions. While either a Node B or WTRU may perform such predictions, the present invention will be described hereinafter as being performed at the WTRU. Additionally, although the invention will be described as a receiver performing measurements and deriving the CQI, it is equally possible for the receiver to perform the measurements and transmit the measurements to the transmitter which then derives the CQI. It would also be understood by those of skill in the art that the present invention is equally applicable to the uplink (UL) or DL transmissions, such as in the case of link adaptation in the UL, where the roles of the WTRU and the Node B as described hereinafter will be reversed.

In a slotted system where the transmission bursts may span several time slots, interference levels in these time slots can vary greatly. The present invention recognizes that channel fading conditions may change substantially from slot to slot. By allowing (but not requiring) CQI prediction on a per slot basis, the prediction of channel quality can be improved. The channel quality reported to the transmitter can therefore be made more accurate, compared to the prior art situations.

Figure 3:
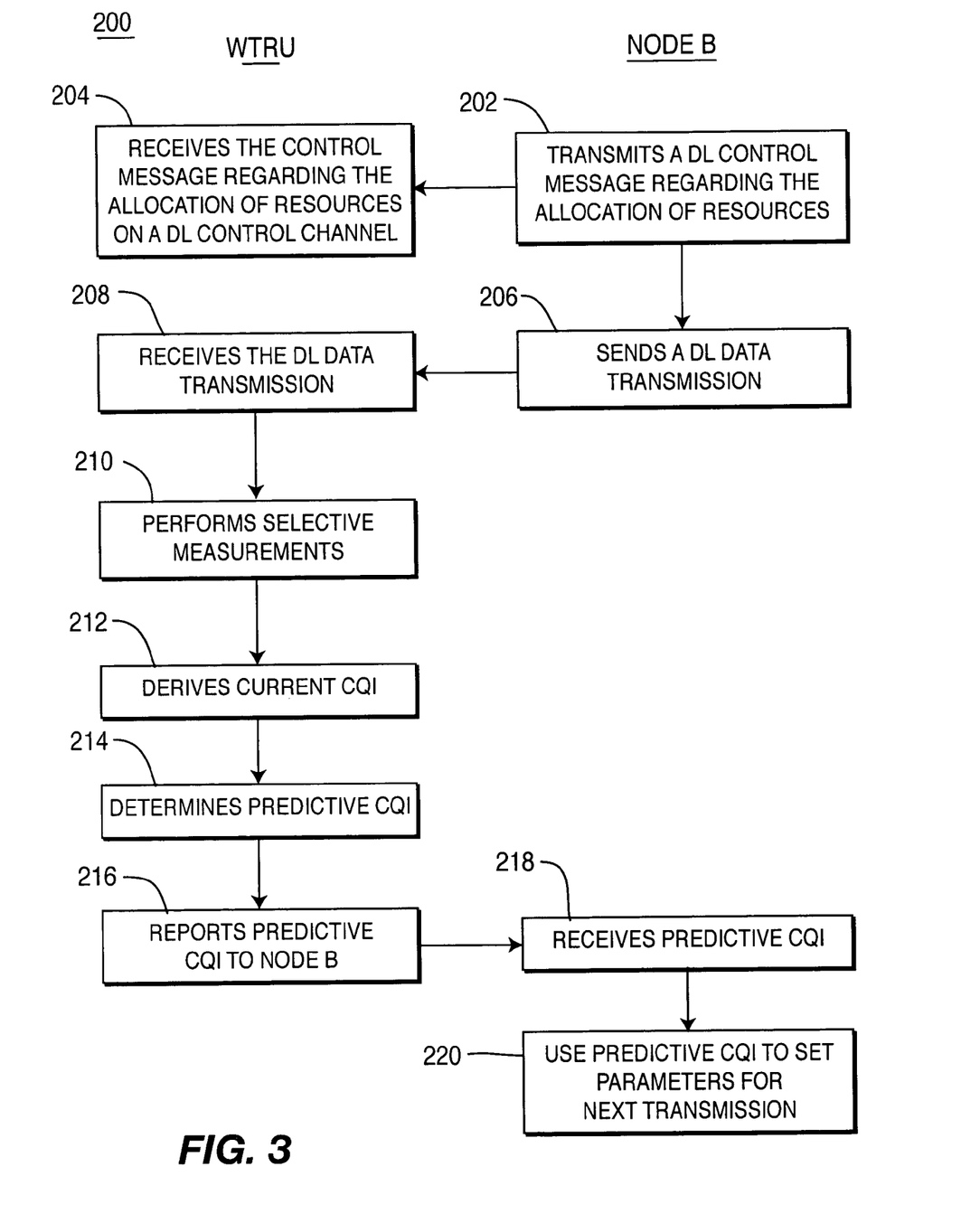
FIG. 3 is a predictive CQI generation and reporting method in accordance with a preferred embodiment of the present invention.

Referring to FIG. 3, a procedure 200 for generating and reporting a CQI in accordance with the present invention is shown. The procedure 200 is initiated by the Node B transmitting a downlink control message regarding the allocation of resources to the WTRU (step 202). The WTRU receives the control message regarding the allocation of resources on the downlink control channel (step 204). The message informs the WTRU of the timing of a subsequent data transmission, and of the transmission parameters of the subsequent data transmission (for example, the type of modulation, coding, etc.). The Node B then sends a downlink data transmission to the WTRU (step 206) which is received by the WTRU (step 208). The WTRU makes selective CQI measurements regarding the downlink data transmission (step 210), derives the current CQI (step 212), and then determines a predictive CQI (step 214). As part of step 214, the WTRU stores one or more of the CQI measurements and/or the CQI for later use in determining the predictive CQI. Additionally, it should be noted that it is not necessary to derive a current CQI in order to determine the predictive CQI. Thus, step 212 could be considered optional in this embodiment. For example, past CQI measurements may be combined with current CQI measurements to derive a predictive CQI.

The predictive CQI is derived from both current measurements and at least one past measurement. The WTRU retrieves one or more of the past CQI measurements (or the past CQI themselves), and combines it with the current CQI measurement (or current CQI), to predict the quality of future channel conditions.

In one embodiment of the present invention, the prediction method used in step 214 to derive the predictive CQI is the Linear Prediction method. This is a well known mathematical technique for predicting future values based upon the combination of current and past information. The Linear Prediction method minimizes the prediction error in the least squares sense. In a preferred embodiment, the signal-to-interference ratio (SIR) expressed in dB is the quantity being predicted. However, other factors may be included, such as prediction of signal power and noise power separately. Other prediction methods can be used, and may be selected with both performance and minimizing complexity in mind.

After the predictive CQI is derived at step 214, the WTRU reports the predictive CQI to the Node B (step 216) and the Node B receives the predictive CQI at step 218. The Node B then uses the predictive CQI to set transmission parameters for the next transmission (step 220).

It should be understood by those of skill in the art that certain steps may be combined depending upon the specific implementation of this method. For example, as shown in an alternative embodiment of a method 400 of the present invention in FIG. 4, steps 210, 212, and 214 may be combined into a single step 408 for determining the predictive CQI. All other steps in FIG. 4 remain the same as the steps described with reference to FIG. 3.

Figure 5:
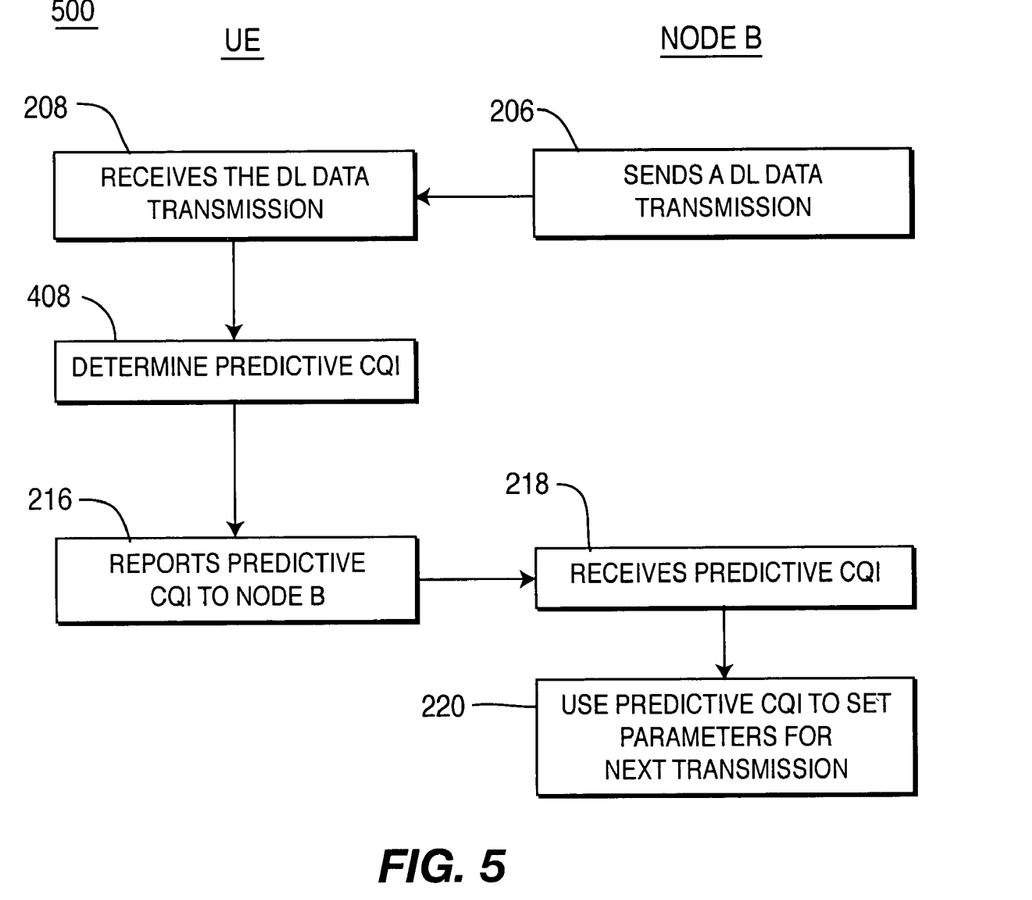
FIG. 5 is a predictive CQI generation and reporting method in accordance with a second alternative embodiment of the present invention.

Additionally, as shown in FIG. 5, steps 202 and 204 need not be part of the procedure 500, whereby the WTRU automatically receives the DL data transmission without a prior DL control message.

Figure 4:
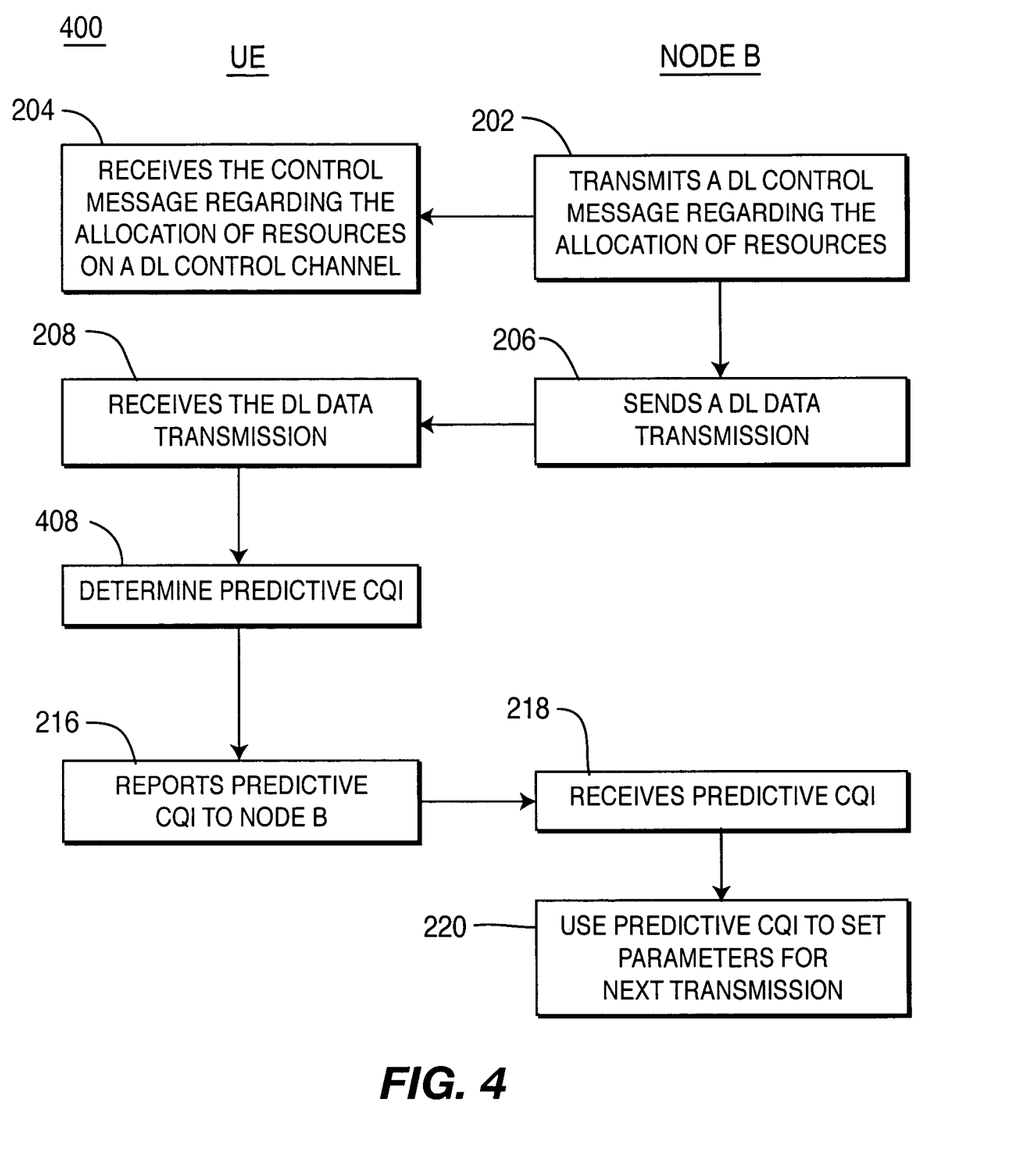
FIG. 4 is a predictive CQI generation and reporting method in accordance with a first alternative embodiment of the present invention.

Whether the specific process for determining the CQI is set forth in separate steps 210-214 as shown in FIG. 3 or a single step 408 as shown in FIG. 4, it would be understood by those of skill in the art that, in contrast to the prior art methods of CQI determination which reflect the past conditions of a communication channel, the present invention derives a predictive CQI which predicts the future conditions of a communication channel. The present invention makes current measurements, but predicts and reports to the Node B a predictive CQI which estimates future channel conditions. As aforementioned, this predictive CQI is derived from both a current CQI measurement or current CQI derived therefrom and at least one past CQI measurement or past CQI derived therefrom that has been stored. The predictive CQI estimates the quality of the channel conditions closer to the time the Node B is ready to transmit.

Although the CQI is shown as being derived from only a single data channel, the UE may use the DL data transmission (of step 206), any available pilot signals, or combinations of both to derive the CQI.

In accordance with the preferred method 200 of the present invention, the predictive CQI will be much more likely to reflect the actual channel conditions that the Node B will experience when it is ready to send another transmission, rather than a CQI measurement that is reflective of a past transmission, as shown in FIGS. 1 and 2.

Figure 6:
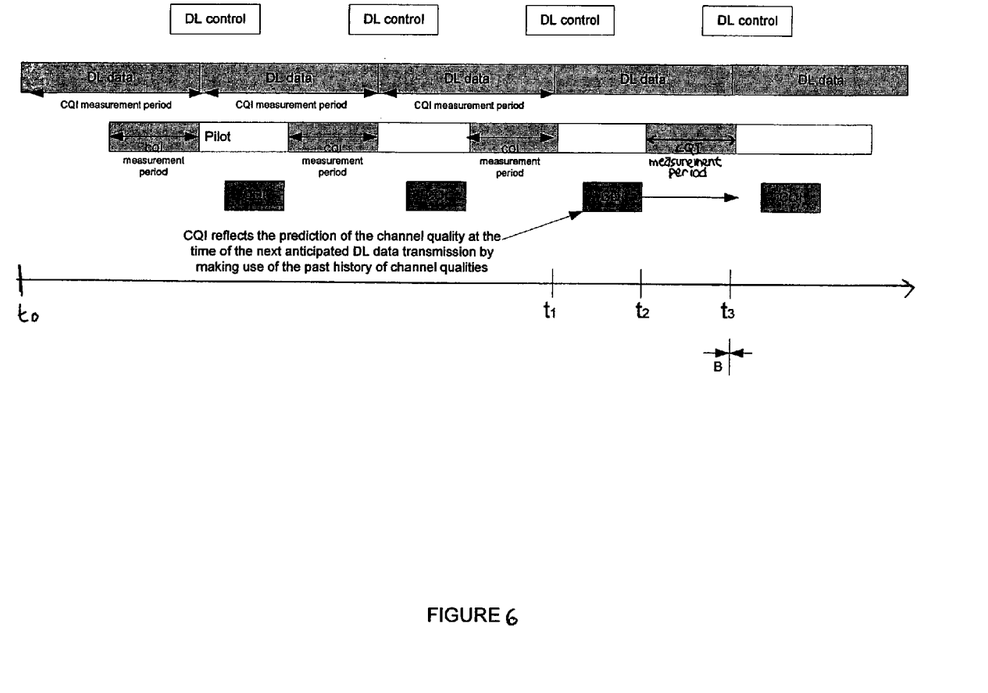
FIG. 6 is a timing diagram showing the elimination of the inherent CQI delay associated with the embodiments of the present invention shown in FIGS. 3 and 4.

Referring to FIG. 6, although the WTRU makes the current CQI measurement at the same time as the prior art scheme (at time $t_1$), and then combines it with the prior CQI measurements for transmission to the Node B at the same time as the prior art scheme (at time $t_2$), the WTRU in accordance with the present invention predicts what the channel condition will be at time $t_3$. In the example illustrated in FIG. 6, the "apparent" CQI delay vanishes since the CQI has been predicted to line-up in time with the DL data channel. Accordingly, when the Node B is ready to transmit the DL data (at time $t_3$), there is no delay (shown as B=0), since the predictive CQI that was sent is a CQI that was predicted at time $t_3$.

Even if there is a delay between the completion of the CQI measurements (at time $t_1$) and the use of the measurement by the Node B, this delay will be shorter than the delay A shown in FIG. 2. By using available past information about the channel quality history, the reported CQI can be computed to reflect the channel quality that will exist at the time of the next DL data transmission, thereby making the selected code rate, modulation type and other link adaption parameters more accurate.

Although FIG. 6 shows the CQI measurements being performed on both the DL data channel and the DL pilot channel, it would be understood by those of skill in the art that the CQI measurements may be performed solely on a DL data channel, solely on a DL pilot channel, or performed on a combination of both the DL data and pilot channels.

Figure 7:
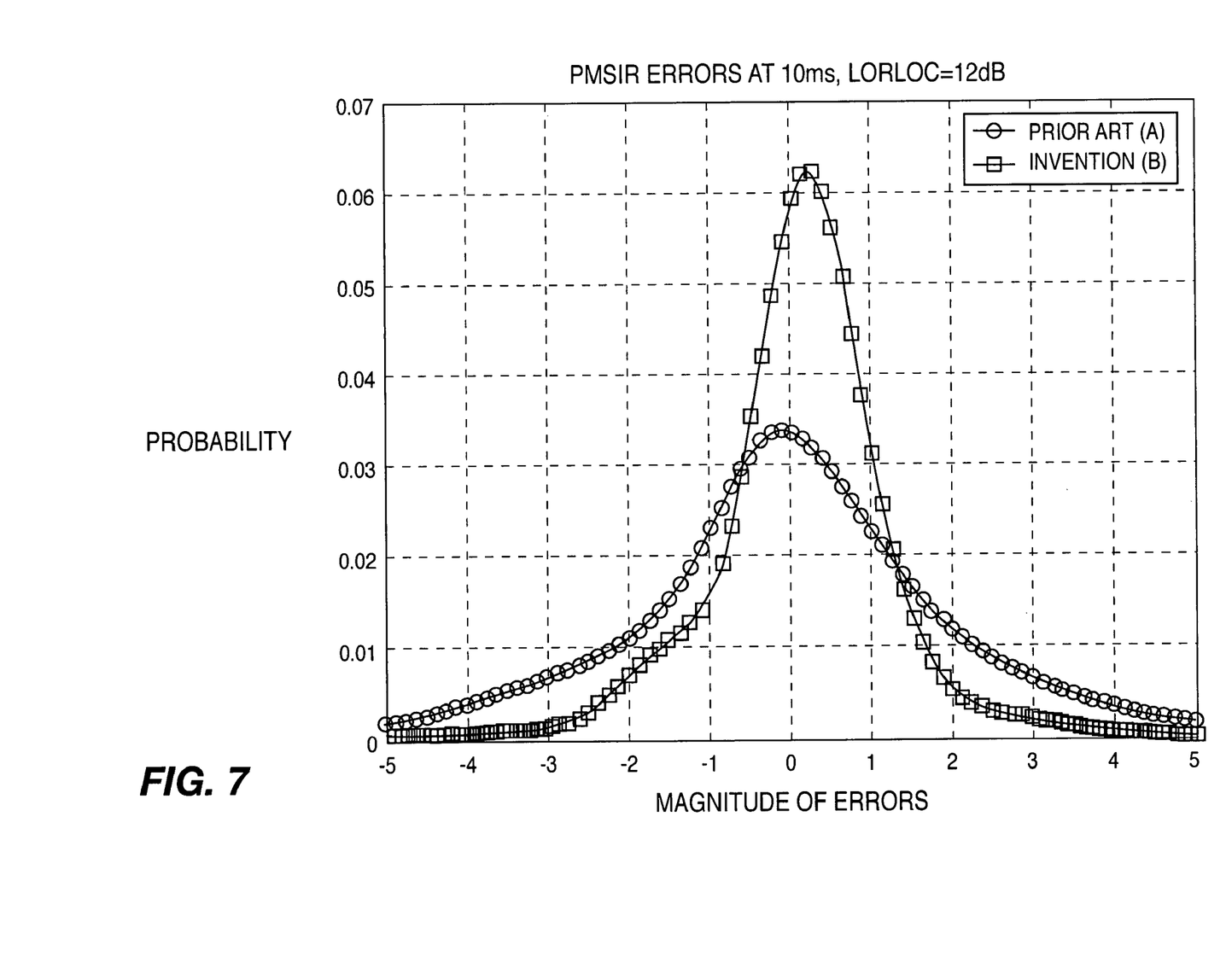
FIG. 7 is a graph showing the distribution of the difference between the CQI generation and reporting process in accordance with the prior art and the predictive CQI generation and reporting process in accordance with the present invention.

Although there will also be an associated error in the predictive CQI measurement (since it is predicted and not actual), this error is likely to be smaller than the prior art method of sending an outdated CQI measurement. FIG. 7 shows how using the prediction scheme used in accordance with the present invention can be employed to improve the reporting accuracy of channel quality conditions at the time of the actual transmission, thereby improving the preference of any dynamic link adaption systems. In FIG. 7, a distribution of the difference between the SIR measured and the SIR at the time the SIR is used is shown. In this example, the delay is 10 msec.

There are two probability distribution curves shown, one for the prior art method of sending a CQI measurement based on past channel conditions, illustrated as curve A, and the second for the current method of sending a predictive CQI measurement based upon a future channel condition, illustrated as curve B. With the present invention (curve B), there is a higher likelihood that an associated error will be smaller, and a lower likelihood that an associated error will be larger, than with the curve A of the prior art method. The distribution for the prediction signal in accordance with the present invention is more concentrated near zero error than the delayed signal of the prior art, indicating that the CQI reporting errors are smaller when using predictive CQI.

Although the present invention has been described in detail, it is to be understood that the invention is not limited thereto, and that various changes can be made therein without departing from the scope of the invention, which is defined by the attached claims.

What is claimed is:

1. A method for predicting a future quality of a downlink communication channel comprising:
  receiving a downlink data communication;
  performing at least one current quality measurement on the downlink data communication to determine the current quality of the downlink communication channel;
  retrieving at least one stored quality measurement;
  deriving, based on the current quality measurement and the at least one stored quality measurement, a predictive channel quality indication (CQI) estimating the future quality of the downlink communication channel on a per time slot basis; and
  transmitting the predictive CQI to a Node B, wherein the predictive CQI includes at least one of a recommended transport block size, modulation format, or number of codes.

2. The method of claim 1, further including storing the at least one current quality measurement.

3. The method of claim 1, further including storing the predictive CQI.

4. The method of claim 1, wherein deriving the predictive CQI utilizes a linear predictive algorithm.

5. A method for providing predictive channel quality measurements of a downlink communication channel comprising:
monitoring said downlink communication channel;
performing at least one current quality measurement on the downlink communication channel to determine the current quality of the downlink communication channel;
retrieving at least one stored quality measurement;
deriving, based on the performing at least one current quality measurement and the at least one stored quality measurement, a prediction of the future quality of the downlink communication channel on a per time slot basis; and
transmitting the prediction to a Node B, wherein the prediction represents at least one of a recommended transport block size, modulation format, or number of codes.

6. The method of claim 5, further including storing the at least one current quality measurement.

7. The method of claim 5, further including storing the prediction.

8. The method of claim 5, wherein the deriving a prediction utilizes a linear predictive algorithm.

9. A method for predicting a future quality of a communication channel comprising:
receiving a downlink data communication;
receiving a pilot channel communication;
performing at least one current quality measurement on the downlink communication channel and the pilot channel communication to determine the current quality of the downlink communication channel;
retrieving at least one stored quality measurement;
deriving, based on the at least one current quality measurement and the at least one stored quality measurement, a predictive channel quality indication (CQI) and estimating the future quality of the downlink communication channel on a per time slot basis; and
transmitting the predictive CQI to a Node B, wherein the predictive CQI includes at least one of a recommended transport block size, modulation format, or number of codes.

10. The method of claim 9, further including storing the at least one current quality measurement.

11. The method of claim 9, further including storing the predictive CQI.

12. The method of claim 9, wherein the deriving a predictive CQI utilizes a linear predictive algorithm.

13. The method of claim 1 performed at a wireless transmit/receive unit (WTRU).

14. The method of claim 5 performed at a wireless transmit/receive unit (WTRU).

15. The method of claim 9 performed at a wireless transmit/receive unit (WTRU).

* * * * *